United States Patent
Okada

(10) Patent No.: US 10,951,810 B2
(45) Date of Patent: Mar. 16, 2021

(54) IMAGE SENSOR SYSTEM, IMAGE SENSOR, DATA GENERATION METHOD OF IMAGE SENSOR IN IMAGE SENSOR SYSTEM, AND NON-TRANSITORY COMPUTER-READABLE RECORDING MEDIUM

(71) Applicant: OMRON Corporation, Kyoto (JP)

(72) Inventor: Naoki Okada, Itami (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/218,453

(22) Filed: Dec. 12, 2018

(65) Prior Publication Data

US 2019/0281208 A1    Sep. 12, 2019

(30) Foreign Application Priority Data

Mar. 8, 2018 (JP) .............................. JP2018-041983

(51) Int. Cl.
*H04N 5/232* (2006.01)
*G06T 7/73* (2017.01)
(Continued)

(52) U.S. Cl.
CPC ....... *H04N 5/23216* (2013.01); *G06F 1/1686* (2013.01); *G06F 3/14* (2013.01);
(Continued)

(58) Field of Classification Search
CPC ........... H04N 5/23216; H04N 5/23203; H04N 5/23293; G06T 7/73
See application file for complete search history.

(56) References Cited

U.S. PATENT DOCUMENTS 5,321,750 A * 6/1994 Nadan .................. H04N 7/1675
348/476
7,978,618 B2 * 7/2011 Richardson ........ H04N 1/00244
370/252
(Continued)

FOREIGN PATENT DOCUMENTS

JP     2009047446     3/2009

OTHER PUBLICATIONS

"Search Report of Europe Counterpart Application", dated Jul. 12, 2019, p. 1-p. 10.
(Continued)

*Primary Examiner* — Antoinette T Spinks
(74) *Attorney, Agent, or Firm* — JCIPRNET

(57) ABSTRACT

Provided is a technique capable of generating data of a screen suitable for each operation terminal displaying information of an image sensor. An image sensor system has an image sensor that performs an examination of a product and an operation terminal for externally operating the image sensor. In addition, the image sensor system includes a recognition part configured to specify user information of a user who uses the operation terminal and device information of the operation terminal, a determination part configured to determine display information on the examination displayed on a display part used by the operation terminal and a disposition of the display information on the display part on the basis of the specified user information and the specified device information, and a generation part configured to generate data for displaying the display information in the determined disposition on the display part of the operation terminal.

16 Claims, 12 Drawing Sheets

(51) Int. Cl.
*G06F 1/16* (2006.01)
*G06K 9/00* (2006.01)
*G06F 3/14* (2006.01)
*H04N 7/18* (2006.01)
*G06F 9/451* (2018.01)

(52) U.S. Cl.
CPC ............ *G06F 3/1454* (2013.01); *G06F 9/451* (2018.02); *G06K 9/00671* (2013.01); *G06T 7/73* (2017.01); *H04N 7/183* (2013.01); *G09G 2340/04* (2013.01); *G09G 2340/14* (2013.01); *G09G 2354/00* (2013.01); *H04N 5/23203* (2013.01); *H04N 5/23293* (2013.01)

(56) References Cited

U.S. PATENT DOCUMENTS

| | | | | |
|---|---|---|---|---|
| RE43,362 E | * | 5/2012 | Yerazunis | ................ G09G 5/00 345/629 |
| 2011/0037865 A1 | | 2/2011 | Takagi et al. | |
| 2013/0332523 A1 | * | 12/2013 | Luu | .................... G06Q 30/0269 709/204 |
| 2017/0126843 A1 | | 5/2017 | Pantea et al. | |

OTHER PUBLICATIONS

Michael Stangl, et al., "Development of a Web Based Monitoring System for a Distributed and Modern Production," Procedia CIRP, vol. 52, Sep. 2016, pp. 222-227.
Wikipedia, "User Agent," accessed Jan. 2020, Available at: https://de.wikipedia.org/w/index.php?title=User_Agent&oldid=171989185.

* cited by examiner

| Group 1 Scene 123 | NG | | 89ms |
|---|---|---|---|
| Determination | Number of measurements | Measured | Time |
| NG | 218 | 146.0000 | 3:52:41 |
| NG | 215 | 142.0000 | 3:52:41 |
| NG | 214 | 141.0000 | 3:52:40 |
| NG | 174 | 160.0000 | 3:52:39 |
| NG | 170 | 141.0000 | 3:52:39 |
| NG | 168 | 161.0000 | 3:52:36 |
| NG | 163 | 142.0000 | 3:52:35 |
| NG | 158 | 142.0000 | 3:52:34 |

FIG. 7C

IMAGE SENSOR SYSTEM, IMAGE SENSOR, DATA GENERATION METHOD OF IMAGE SENSOR IN IMAGE SENSOR SYSTEM, AND NON-TRANSITORY COMPUTER-READABLE RECORDING MEDIUM

CROSS-REFERENCE TO RELATED APPLICATION

This application claims the priority of Japan patent application serial no. 2018-041983, filed on Mar. 8, 2018. The entirety of the above-mentioned patent application is hereby incorporated by reference herein and made a part of this specification.

BACKGROUND

Technical Field

The disclosure relates to an image sensor system using an image sensor that performs an examination of a product, the image sensor, a data generation method related to the image sensor, and a program.

Description of Related Art

In a manufacturing line of a factory, an image sensor system using an image sensor has been frequently used in order to automate examination or management of a product and labor saving thereof (Patent Document 1). In addition, in order to maintain the image sensor or the like, information of the image sensor is also checked using an external operation terminal such as a personal computer (PC) or a tablet.

PATENT DOCUMENTS

[Patent Document 1] Japanese Laid-open No. 2009-47446

In the related art, on a premise that a screen size of an operation terminal, a screen resolution, or the like is within a predetermined range, a common screen layout is used even in a case where data of a screen displayed on an external operation terminal is output to any terminal. In addition, for a special operation terminal which is not able to suitably display information of an image sensor with a common screen layout, a program for generating data of a display screen of image sensor information based on a dedicated screen layout is used.

Therefore, for example, in a case where a personal computer (PC), a tablet, or a smartphone is used as the external operation terminal, even though any display is able to display the information of the image sensor, on a display of the PC or a display of the tablet or the smartphone, since a screen size, screen resolution, or the like is different, in a case where the data of the display screen of the image sensor information is generated based on the screen layout common to these operation terminals, a screen display that is easy for the user to see on the display of the PC may be a screen display that is hard for the user to see on the display of the tablet or the smartphone, and, on the contrary, a screen display that is hard for the user to see on the display of the PC may be a screen display that is easy for the user to see on the display of the tablet or the smartphone. In addition, there is a possibility that it is not realistic to provide a program for generating data of a screen layout of the display screen of the image sensor information for each operation terminal.

The disclosure provides a technique capable of generating data of a screen suitable for each operation terminal displaying information of an image sensor.

SUMMARY

An aspect of the disclosure provides an image sensor system having an image sensor that performs an examination of a product and an operation terminal for externally operating the image sensor. The image sensor system includes a recognition part configured to specify user information of a user who uses the operation terminal and device information of the operation terminal, a determination part configured to determine display information on the examination displayed on a display part used by the operation terminal and a disposition of the display information on the display part on the basis of the specified user information and the specified device information, and a generation part configured to generate data for displaying the display information in the determined disposition on the display part of the operation terminal.

In addition, an image sensor used for the image sensor system is able to be provided. The image sensor has at least one functional part of the recognition part, the determination part, and the generation part. The image sensor further includes a transmission part configured to transmit information processed by the functional part included in the image sensor to an outside.

In addition, according to an aspect of the present application, a data generation method of an image sensor in an image sensor system having the image sensor that performs an examination of a product and an operation terminal for externally operating the image sensor is provided. The data generation method includes specifying, by a recognition part of the image sensor system, user information of a user who uses the operation terminal and device information of the operation terminal from the operation terminal, determining, by a determination part of the image sensor system, display information on the examination displayed on a display part used by the operation terminal and a disposition of the display information on the display part on the basis of the specified user information and the specified device information, and generating, by a generation part of the image sensor system, data for displaying the display information in the determined disposition on the display part of the operation terminal.

In addition, according to an aspect of the present application, a data generation program of an image sensor in an image sensor system having the image sensor that performs an examination of a product and an operation terminal for externally operating the image sensor is provided. The data generation program causes a computer in the image sensor system to execute following processes: specifying user information of a user who uses the operation terminal and device information of the operation terminal, determining display information on the examination displayed on a display part used by the operation terminal and a disposition of the display information on the display part on the basis of the specified user information and the specified device information, and generating data for displaying the display information in the determined disposition on the display part of the operation terminal.

BRIEF DESCRIPTION OF THE DRAWINGS

FIG. 7C is a diagram schematically illustrating a display example of another image sensor information in the smartphone used by the user belonging to the category of the line manager.

DESCRIPTION OF THE EMBODIMENTS

Hereinafter, details of an image sensor system according to an embodiment will be described with reference to the drawings.

Application Example

First, an example of a scene to which the disclosure is applied will be described. In the embodiment exemplified below, it is assumed that a product is examined by an image sensor in a manufacturing line. In addition, it is assumed that designers A and B of the image sensor, line managers C and D of the manufacturing line in which the image sensor is used, and site operators E and F who perform adjustment or the like of the image sensor at a site of the manufacturing line display information on the image sensor using operation terminals as different external devices respectively. The image sensor system of the present embodiment includes the above-described image sensor and the operation terminal used by each user.

The image sensor is installed in, for example, a manufacturing line or the like of a factory and is used for various processes using an image. The image sensor is also referred to as a vision sensor, a vision system, or the like. The image sensor is able to be used in a variety of applications. For example, the image sensor is able to record an image of an object to be examined, recognize a shape, detect an edge, measure a width/number, measure an area, acquire a color feature, perform labeling or segmentation, recognize an object, read a barcode or a 2-dimensional code, perform an optical character recognition (OCR), perform individual identification, and the like. In addition, the image sensor is a device that performs control of a camera that images the product, an image process (for example, pre-processing, feature amount extraction, and the like) on image data of the product captured from the camera, various processes based on a result of the image process (for example, examination, character recognition, individual identification, and the like), data transmission/reception with an operation terminal, a process on data received from the operation terminal, generation of data to be output to the operation terminal, and the like.

Figure 1:
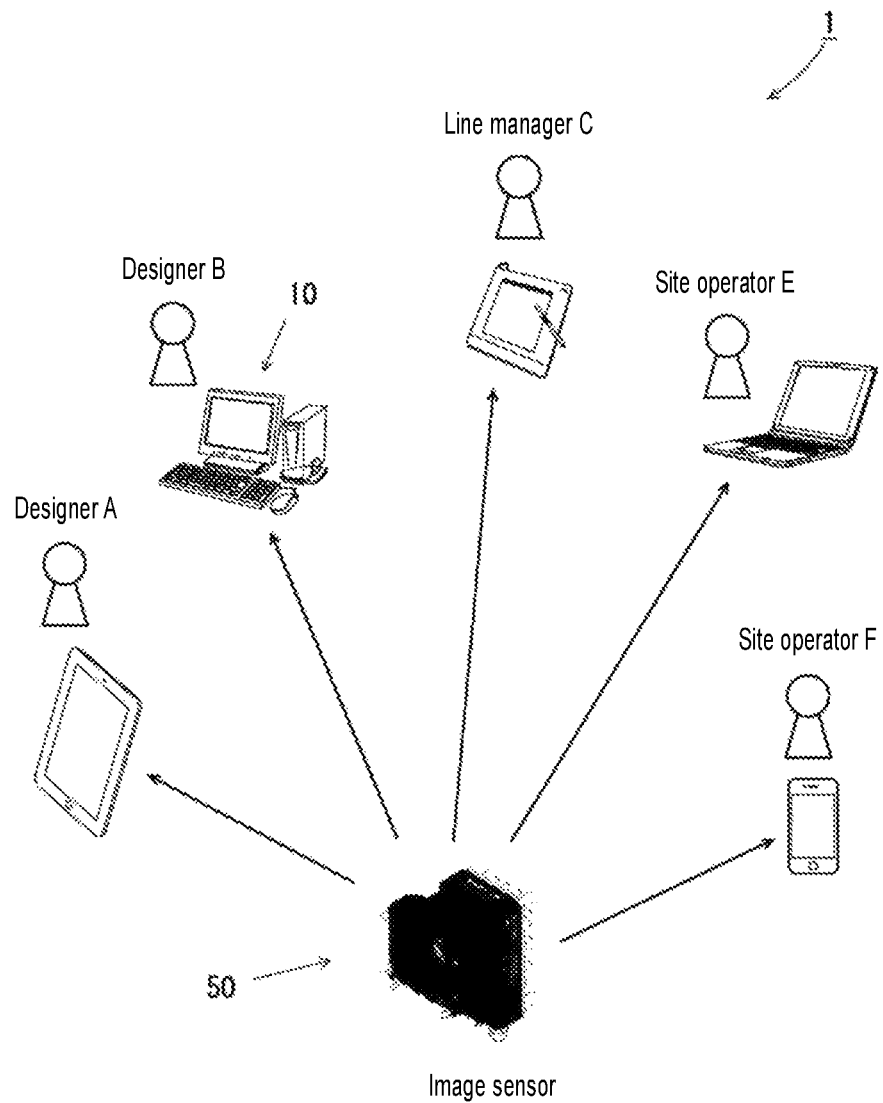
FIG. 1 is a diagram schematically illustrating an example of use of image sensor information in an image sensor system.

In addition, the operation terminal is a terminal used for operating the image sensor. An example of the operation terminal includes a personal computer (PC), a tablet, a smartphone, or the like. As shown in FIG. 1, in the following description, a case where the designer B of the image sensor 50 displays information on the image sensor 50 using the operation terminal 10 (PC as an example) will be described. However, the following description is able to be applied to a case where other users display the information on the image sensor using different operation terminals. In addition, the number of image sensors to which the operation terminal is connected is not limited to one.

In the present embodiment, a user of the image sensor is divided into categories related to the image sensor, and the information of the image sensor according to the category to which the user belongs is provided to the user. In addition, a screen layout for displaying the information of the image sensor is determined according to the operation terminal used by the user. Therefore, the user can display suitable information with a suitable screen layout based on the category to which each user belongs using the operation terminal.

<Configuration of Image Sensor System>

Figure 2:
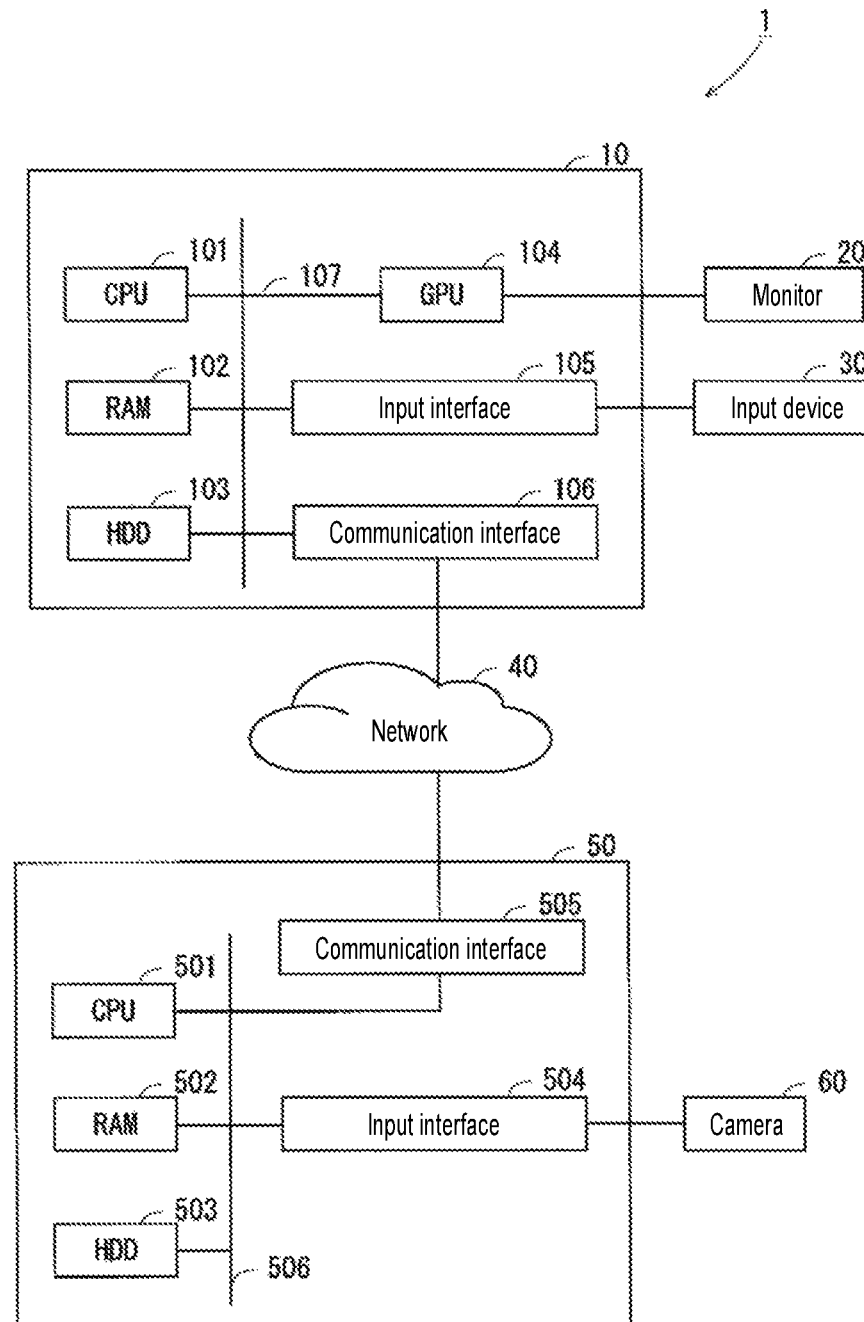
FIG. 2 is a block diagram schematically illustrating a configuration of the image sensor system.

The image sensor system 1 in one embodiment will be described. As illustrated in FIG. 2, in the image sensor system 1, the operation terminal 10, which is used by the designer B who is the user of the image sensor 50, and the image sensor 50 are connected with each other through a network 40.

The operation terminal 10 has a central processing unit (CPU) 101, a random access memory (RAM) 102, a hard disk drive (HDD) 103, a graphics processing unit (GPU) 104, an input interface 105, and a communication interface 106. In addition, the GPU 104, the input interface 105, and the communication interface 106 are connected to a monitor 20, an input device 30, and the network 40, respectively. The CPU 101, the RAM 102, the HDD 103, the GPU 104, the input interface 105, and the communication interface 106 are connected to each other through a bus 107. In addition, the image sensor 50 has a CPU 501, a RAM 502, an HDD 503, an input interface 504, and a communication interface 505. The input interface 504 is connected to a camera 60 that images the product of the manufacturing line. The CPU 501, the RAM 502, the HDD 503, the input interface 504, and the communication interface 505 are connected to each other through a bus 506.

In the present embodiment, the user operates the input device 30 and the like to instruct the operation terminal 10 to connect to the image sensor 50. The operation terminal 10 is connected to the image sensor 50 through the network 40 according to the input instruction. After establishing the connection with the operation terminal 10, the image sensor 50 generates data for displaying the information of the image sensor 50 on the monitor 20 of the operation terminal 10 based on the information acquired from the operation terminal 10. The generated data is transmitted from the image sensor 50 to the operation terminal 10 through the network 40. The operation terminal 10 displays the information of the image sensor 50 included in the received data on the monitor 20 with a screen layout included in the data received from the image sensor 50.

In the present embodiment, in the operation terminal 10, the CPU 101 executes various processes described below by developing various programs stored in the HDD 103 to the RAM 102 and executing the various programs. Similarly, in the image sensor 50, the CPU 501 functions as a Web server as an example and executes various processes described below by developing various programs stored in the HDD 503 to the RAM 502. Note that, part or all of the functions of the CPU 101 and 501 may be realized by an application specific integrated circuit (ASIC), a field-programmable gate array (FPGA), or the like, or may be provided by an external device.

In addition, in the present embodiment, it is assumed that the HDD 503 of the image sensor 50 also stores information in advance about a condition for specifying a type of a device of the operation terminal 10 from user agent information acquired from the operation terminal 10. Here, the type of the device is a PC, a tablet, a smartphone, or the like. Note that the type of the device may include other devices for displaying the information of the image sensor. For example, the CPU 501 specifies a device name of the operation terminal 10 included in the user agent information and specifies which device type the operation terminal 10 corresponds to from the specified device name. In addition, the CPU 501 is able to specify which device type a browser corresponds to from browser information included in the user agent information and specify which device type the operation terminal 10 corresponds to. Furthermore, the CPU 501 is able to specify which device type the operation terminal 10 corresponds to on the basis of whether or not a combination of specific information (for example, a combination of the type of browser and a platform of the operation terminal 10, or the like) is included in the user agent information. As described above, various conditions for the CPU 501 to specify the device type of the operation terminal 10 based on the user agent information are stored in the HDD 503.

Furthermore, it is assumed that information indicating a category related to the image sensor to which each user of the image sensor belongs is stored in the HDD 503 of the image sensor 50 in advance. Here, examples of the category of the user of the image sensor may include a designer of the image sensor, a line manager of the manufacturing line in which the image sensor is used, and a site operator performing adjustment or the like of the image sensor. Furthermore, more detailed categories may be provided on the basis of which component of the image sensor the user is a designer of, what kind of examination on the manufacturing line the user does a line manager manages, what kind of adjustment of the image sensor the user does a site operator do, and the like.

Figure 3:
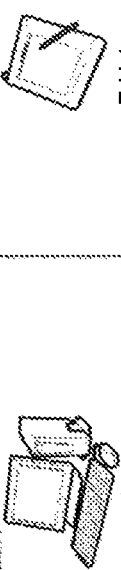
FIG. 3 is a diagram illustrating an example of a screen layout of the image sensor information.

In addition, FIG. 3 illustrates a relationship between display information displayed on a display part such as a monitor used by the operation terminal generated in the present embodiment and the screen layout in the display part. Note that the screen layout in the display part is an example of a disposition of the display information. In addition, in the screen layout, an image processed in the examination by the image sensor, a flow of a process, a detailed result of the process, statistical information, and the like are examples of examination items. In FIG. 3, as an example, it is assumed that the user of the image sensor belongs to one category of "designer", "line manager", and "site operator". In addition, it is assumed that the operation terminal used by the user is one of "PC", "tablet", and "smartphone". As shown in FIG. 3, for each combination of the category of the user and the type of the operation terminal, a usage of the information of the image sensor displayed on the operation terminal is considered to be different.

For example, in a case where the user belonging to the category of the designer checks the information of the image sensor using the PC, since it is assumed that a screen size of the display used by the PC is larger than a screen size of the display of the tablet or the smartphone, as the usage of the information of the image sensor, creation of the flow of the process executed by the image sensor, setting of parameters used for the process, or the like are considered. Therefore, in a case where the category of the user is "designer" and the operation terminal is "PC", a screen layout in which the content of the flow of the process of the image sensor, the process result, the image of the product to be a target, and the like are displayed is considered to be more suitable for the screen layout for displaying the information of the image sensor on the display of the PC.

In addition, in a case where the user belonging to the category of the designer checks the information of the image sensor using the tablet, since it is assumed that the screen size of the display of the tablet is smaller than the screen size of the PC, as the usage of the information of the image sensor, adjustment or the like of the flow of process executed by the image sensor at the site is considered. Therefore, in a case where the category of the user is "designer" and the operation terminal is "tablet", the screen layout for displaying the information of the image sensor on the display of the tablet is more suitable for a screen layout in which the process result or the image of the product to be the target, and the like are displayed and the flow of the process of the image sensor is displayed according to a selection of the user.

Furthermore, in a case where the user belonging to the category of the designer checks the information of the image sensor using the smartphone, since it is assumed that the screen size of the display of the smartphone is smaller than the screen size of the tablet, as the usage of the information of the image sensor, a simple confirmation or the like of an operation of the image sensor is considered. Therefore, in a case where the category of the user is "designer" and the operation terminal is "smartphone", a screen layout in which the flow of the process of the image sensor is not displayed and the process result, the image of the product to be the target, or the like is displayed is considered to be more suitable for the screen layout for displaying the information of the image sensor on the display of the smartphone.

Similarly, in a case where the user belonging to the category of the line manager checks the information of the image sensor using the PC, since the usage of the information of the image sensor may include, for example, a cause analysis of the process in which the product is determined to be defective by the image sensor, a screen layout that is able to execute an analysis program ("analysis tool" in the figure) to analyze cause of process or check an execution result is considered to be more suitable for the screen layout. In addition, in a case where the user belonging to the category of the line manager checks the information of the image sensor using the tablet or the smartphone, a screen layout that is able to check the statistical information based on the process of the image sensor is considered to be more suitable for the screen layout.

In addition, in a case where the user belonging to the category of the site operator checks the information of the image sensor using the PC, since the usage of the information of the image sensor may include, for example, switching of a setup of the process executed by the image sensor, or the like, a screen layout that is able to switch the flow of the process is considered to be more suitable for the screen layout. In addition, in a case where the user belonging to the category of the site operator checks the information of the image sensor using the tablet or the smartphone, a screen layout that is able to check an operation situation of the image sensor including a process situation of a current image sensor is considered to be more suitable for the screen layout.

In the present embodiment, the screen layout of the information of the image sensor displayed on the operation terminal is generated differently according to the combination of the category to which the user belongs and the type of the operation terminal used by the user. In addition, in the HDD 503 of the image sensor 50, the information indicating the screen layout corresponding to the combination of the category to which the user belongs and the type of the operation terminal used by the user is stored in advance.

Display Example of Information of Image Sensor

Figure 4:
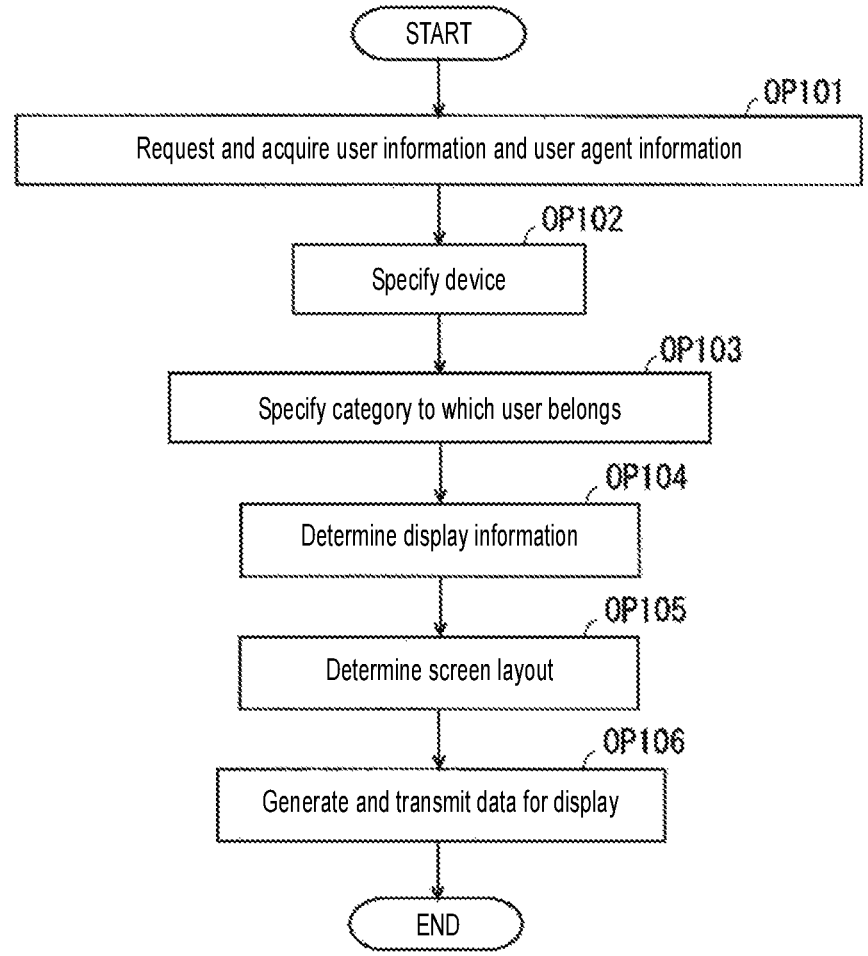
FIG. 4 is a flowchart illustrating an example of a process executed in the image sensor system.

The process executed by the CPU 501 of the image sensor 50 will be described with reference to the flowchart illustrated in FIG. 4. As an example, after establishing the connection with the operation terminal 10, the CPU 501 of the image sensor 50 starts the process of the flowchart shown in FIG. 4.

In OP101, the CPU 501 recognizes the operation terminal 10 accessing the image sensor 50 as a recognition part exemplified as one of functional parts of the image sensor and requests the operation terminal 10 for the user information and the user agent information. Here, at least the device information of the operation terminal 10 is included in the user agent information. In addition, the user information includes information specifying which category of the category stored in the HDD 503 the user belongs, such as information indicating that it is the designer of the image sensor, and user's account information indicating authority on the image sensor, or the like. In addition, the device information includes information on an operating system (OS) executed in the operation terminal 10, information on a browser used for displaying the information of the image sensor in the operation terminal 10, information on a device name of the operation terminal 10, information on a screen size or a resolution of the monitor 20, and the like. Note that the information specifying the screen size or the resolution of the monitor 20, the device name of the operation terminal 10, the OS executed by the operation terminal, and the like is an example of performance information of the operation terminal. The operation terminal 10 transmits the user information and the user agent information to the image sensor 50 in response to a request from the image sensor 50. Therefore, the image sensor acquires the user information and the user agent information of the operation terminal 10. Next, the CPU 501 advances the process to OP102.

In OP102, the CPU 501 specifies the device type of the operation terminal 10 from the user agent information acquired in OP101 and the condition for specifying the device type of the operation terminal 10 stored in the HDD 503. Next, in OP103, the CPU 501 specifies the category to which the user of the operation terminal 10 belongs from the user information acquired in OP101 and the information indicating the category related to the image sensor stored in the HDD 503. Next, the CPU 501 advances the process to OP104.

Next, the CPU 501 determines the display information (OP104) of the image sensor displayed on the monitor 20 of the operation terminal 10 and the screen layout (OP105) of the screen on which the display information is displayed on the basis of the device type of the operation terminal 10 used by the user and the category to which the user belongs, which are specified in OP102 and OP103, as a determination part exemplified as one of the functional parts of the image sensor. Next, the CPU 501 advances the process to OP106.

In OP106, the CPU 501 generates display data for displaying the display information determined in OP104 with the screen layout determined by the operation terminal 10 in OP105, as a generation part exemplified as one of the functional parts of the image sensor. In addition, the CPU 501 functions as a transmission part and transmits the generated display data to the operation terminal 10. The CPU 101 of the operation terminal 10 displays the display information on the monitor 20 with the screen layout on the basis of the screen layout and the display information included in the display data received from the image sensor 50.

As described above, according to the present embodiment, since the screen layout of the screen on which the information of the image sensor is displayed is determined based on the information on the screen size of the display part (such as the monitor 20) of the operation terminal used by the user and the information on the program such as the OS executed by the operation terminal used by the user or the like, the image sensor information is displayed on the display part of the operation terminal with the screen layout that is easy for the user to see. In addition, since the image sensor information displayed on the screen is determined according to the category to which the user using the operation terminal belongs, it is possible to provide the image sensor information according to the usage desired by each user. In addition, the image sensor 50 has the function of the Web server. Therefore, it is possible to determine the screen layout of the image sensor information suitable for each user on the basis of the user agent information when the user displays the image sensor information using the Web browser.

Figure 5A:
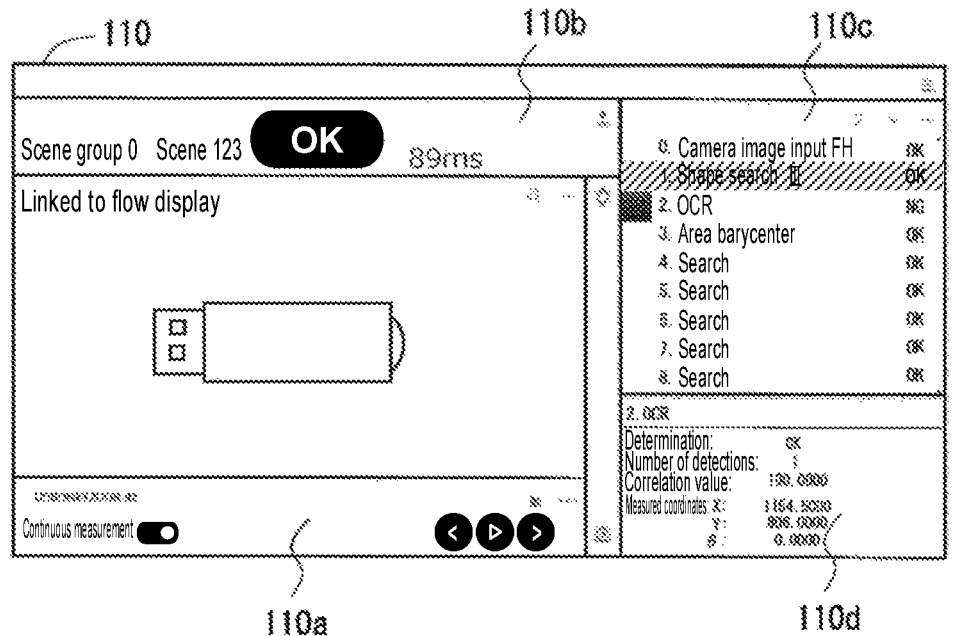
FIG. 5A is a diagram schematically illustrating a display example of the image sensor information in a personal computer (PC) used by a user belonging to a category of a designer.
Figure 5B:
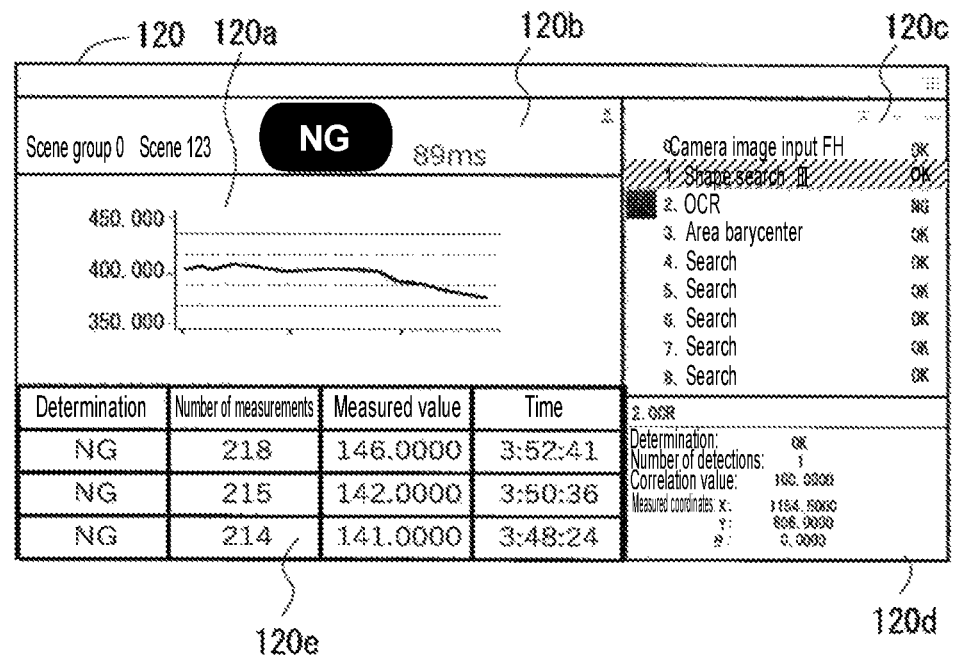
FIG. 5B is a diagram schematically illustrating the display example of the image sensor information in a PC used by a user belonging to a category of a line manager.
Figure 5C:
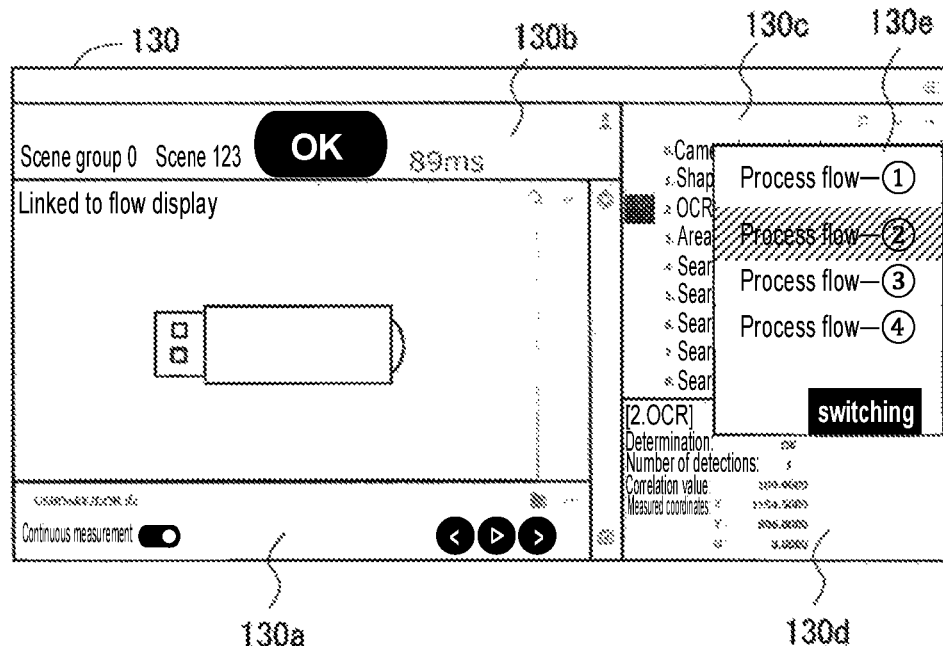
FIG. 5C is a diagram schematically illustrating the display example of the image sensor information in a PC used by a user belonging to a category of a site operator.

FIGS. 5A, 5B, and 5C illustrate display examples of the display information of the image sensor 50 displayed on the operation terminal 10 in OP106 in a case where the operation terminal 10 is the PC. FIG. 5A shows a display example in a case where the user of the operation terminal 10 belongs to the category of the designer. As shown in FIG. 5A, each of an image 110*a* processed by the image sensor 50, a process result 110*b*, a flow 110*c* of the process, and detailed information 110d of the process is displayed on a screen 110. Therefore, the user can change the flow of the process executed in the image sensor 50 based on the displayed information.

FIG. 5B shows a display example in a case where the user of the operation terminal 10 belongs to the category of the line manager. As shown in FIG. 5B, each of a graph 120a showing a transition of a measurement value in the process executed by the image sensor 50, a process result 120b, a flow 120c of the process, detailed information 120d of the process, and an execution result 120e of an analysis program is displayed on a screen 120. Therefore, the user can perform analysis based on the displayed information, for the process in which the product is determined to be defective, for example, as the result of the process by the image sensor 50.

FIG. 5C shows a display example in a case where the user of the operation terminal 10 belongs to the category of the site operator. As shown in FIG. 5C, each of an image 130a processed by the image sensor 50, a process result 130b, a flow 130c of the process, detailed information 130d of the process, and a selection box 130e for flow switching is displayed on a screen 130. Therefore, the user can switch the flow of the process executed by the image sensor 50, for example, while checking the process result of the image sensor or the details of the flow. Note that, in FIG. 5C, as an example, the selection box 130e is displayed superimposed on other display information, and in a case where the user selects the flow and executes the switching, the selection box 130e is not displayed, but the information for switching the flow may be displayed side by side with other information instead of such a selection box 130e or other information may be superimposed and displayed. Similarly to even a screen other than the screen 130, a display form of each piece of information on the screen is not limited to a display form shown in the drawing and may be suitably determined as the screen layout for the screen.

Figure 6A:
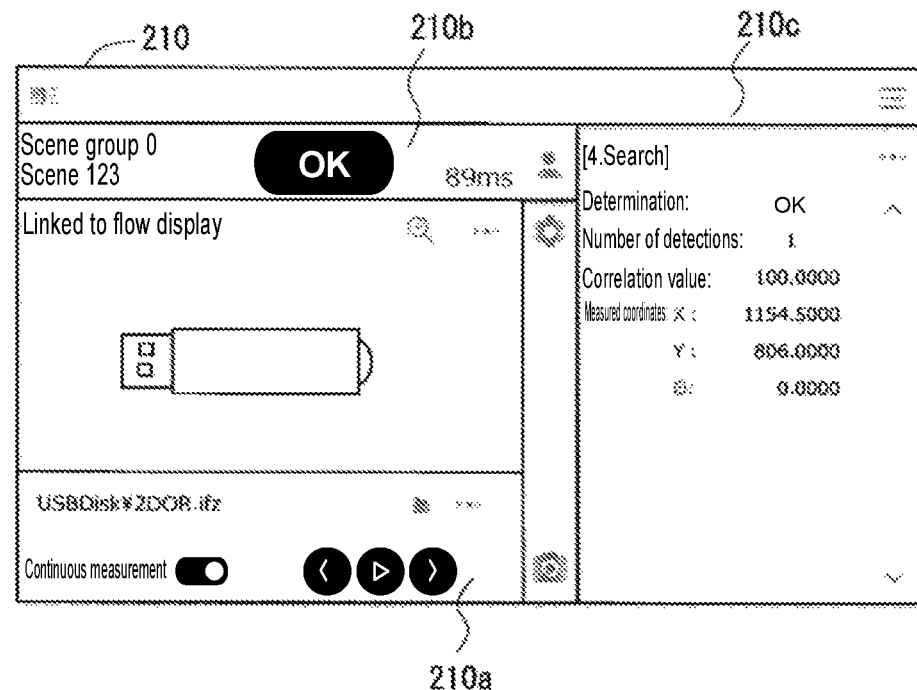
FIG. 6A is a diagram schematically illustrating the display example of the image sensor information in a tablet used by the user belonging to the category of the designer.

FIGS. 6A, 6B, 6C, and 6D illustrate display examples of the display information of the image sensor 50 displayed on the operation terminal 10 in OP106 in a case where the operation terminal 10 is the tablet. FIG. 6A shows a display example in a case where the user of the operation terminal 10 belongs to the category of the designer. As shown in FIG. 6A, each of an image 210a processed by the image sensor 50, a process result 210b, and detailed information 210c about the process is displayed on a screen 210. Therefore, the user can adjust the process of the image sensor 50, for example, at the site where the image sensor 50 is used.

Compared with the screen 110 of FIG. 5A, on the screen 210, a screen layout in which the information of the flow is not displayed is displayed. This is because it is considered that the user who is the designer works using the PC with the large screen size that displays information of which process performance is higher than the tablet in a creation of a flow or the like, and in a case where the user uses the tablet, the user carries the tablet to the site to perform adjustment or the like of the image sensor using the tablet. Note that, also on the screen 210, the information of the flow may be displayed based on the operation of the user.

Figure 6B:
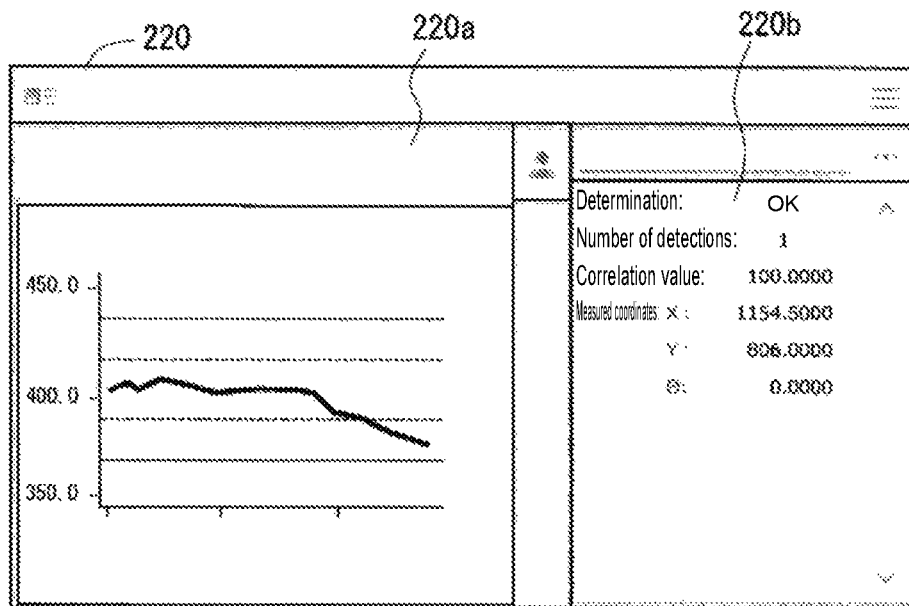
FIG. 6B is a diagram schematically illustrating the display example of the image sensor information in a tablet used by the user belonging to the category of the line manager.
Figure 6C:
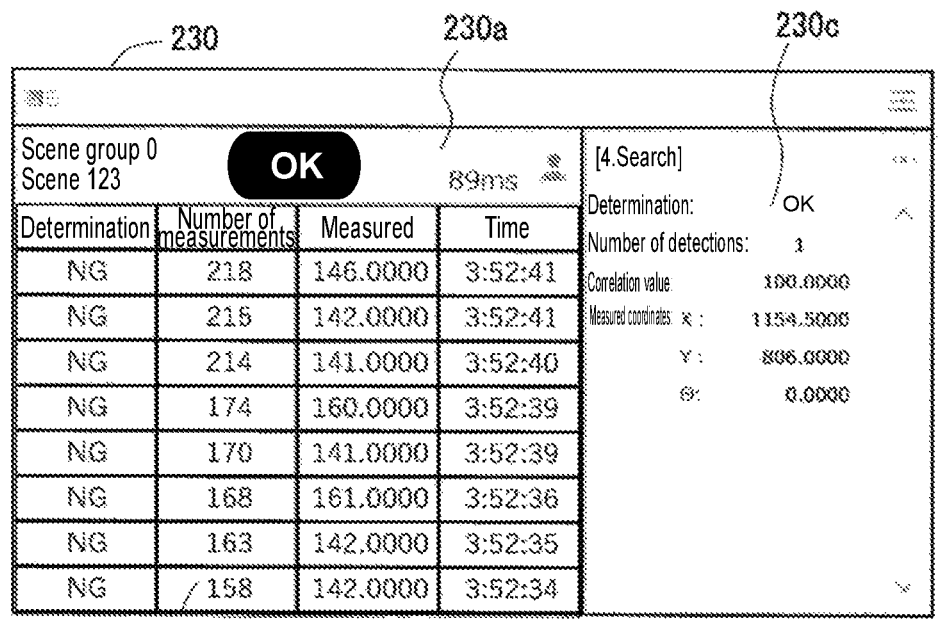
FIG. 6C is a diagram schematically illustrating a display example of another image sensor information in the tablet used by the user belonging to the category of the line manager.

FIGS. 6B and 6C show display examples in a case where the user of the operation terminal 10 belongs to the category of the line manager. As shown in FIG. 6B, each of a graph 220a showing the transition of the measurement value in the process executed by the image sensor 50 and detailed information 220b of the process is displayed on a screen 220. In addition, as shown in FIG. 6C, each of a process result 230a of the process executed by the image sensor 50, detailed information 230b of the process, and an execution result 230c of the analysis program is displayed on a screen 230. In the present embodiment, for example, the user operates the operation terminal 10 to switch the display between the screen 220 and the screen 230. Therefore, for example, the user can check the statistical information based on the process of the image sensor 50 at the site where the image sensor 50 is used. Compared with the screen 120 in FIG. 5B, since it is considered that the screen size of the displayable screen of the tablet is smaller than that of the PC, the information displayed on the screen 120 is divided into two screens 220 and 230 and displayed.

Figure 6D:
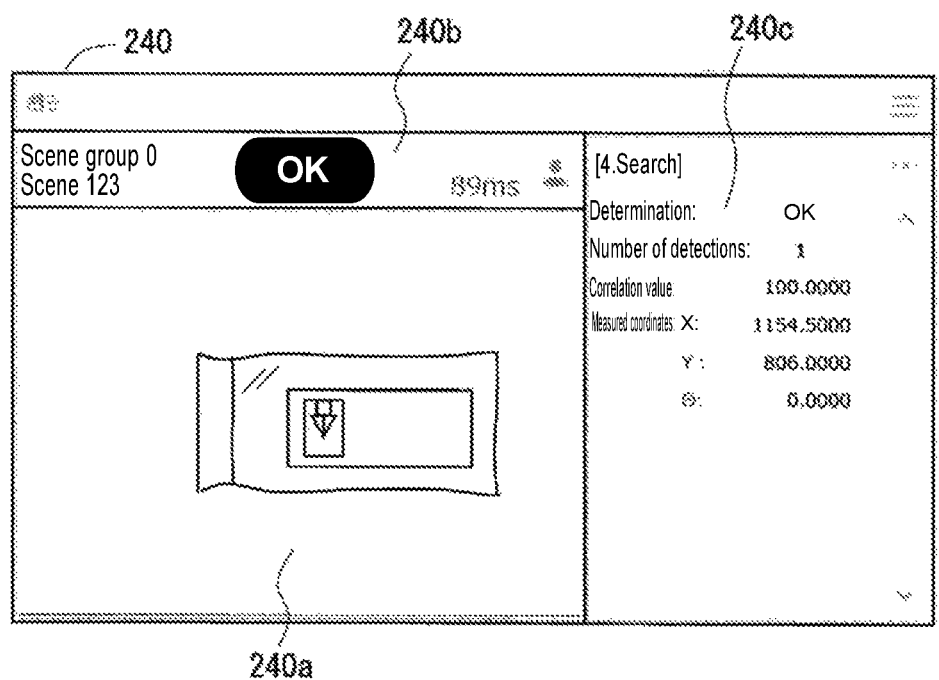
FIG. 6D is a diagram schematically illustrating the display example of the image sensor information in a tablet used by the user belonging to the category of the site operator.

FIG. 6D shows a display example in a case where the user of the operation terminal 10 belongs to the category of the site operator. As shown in FIG. 6D, each of an image 240a processed by the image sensor 50, a process result 240b, and detailed information 240c of the process is displayed on a screen 240. Therefore, the user can check a current operation situation of the image sensor 50. Compared with the screen 130 in FIG. 5C, on the screen 240, a screen layout in which a selection box for switching a flow is not displayed is displayed. This is because the user who is the site operator is considered to check detailed information on each process of the flow using the PC of which the screen size is larger than that of the tablet for flow switching or the like, and in a case where the user uses the tablet, the user carries the tablet to the site to perform a check of the operation of the image sensor or the like using the tablet. Note that, also on the screen 240, the information for switching the flow may be displayed based on the operation of the user.

FIGS. 7A, 7B, 7C, and 7D illustrate display examples of the display information of the image sensor 50 displayed on the operation terminal 10 in OP106 in a case where the operation terminal 10 is the smartphone. Compared with each screen of FIGS. 6A, 6B, 6C, and 6D, since it is assumed that the screen size of the smartphone is smaller than the screen size of the tablet, the screen layout becomes a screen layout in which a display efficiency of information is prioritized over a degree of detail of the display information.

Figure 7A:
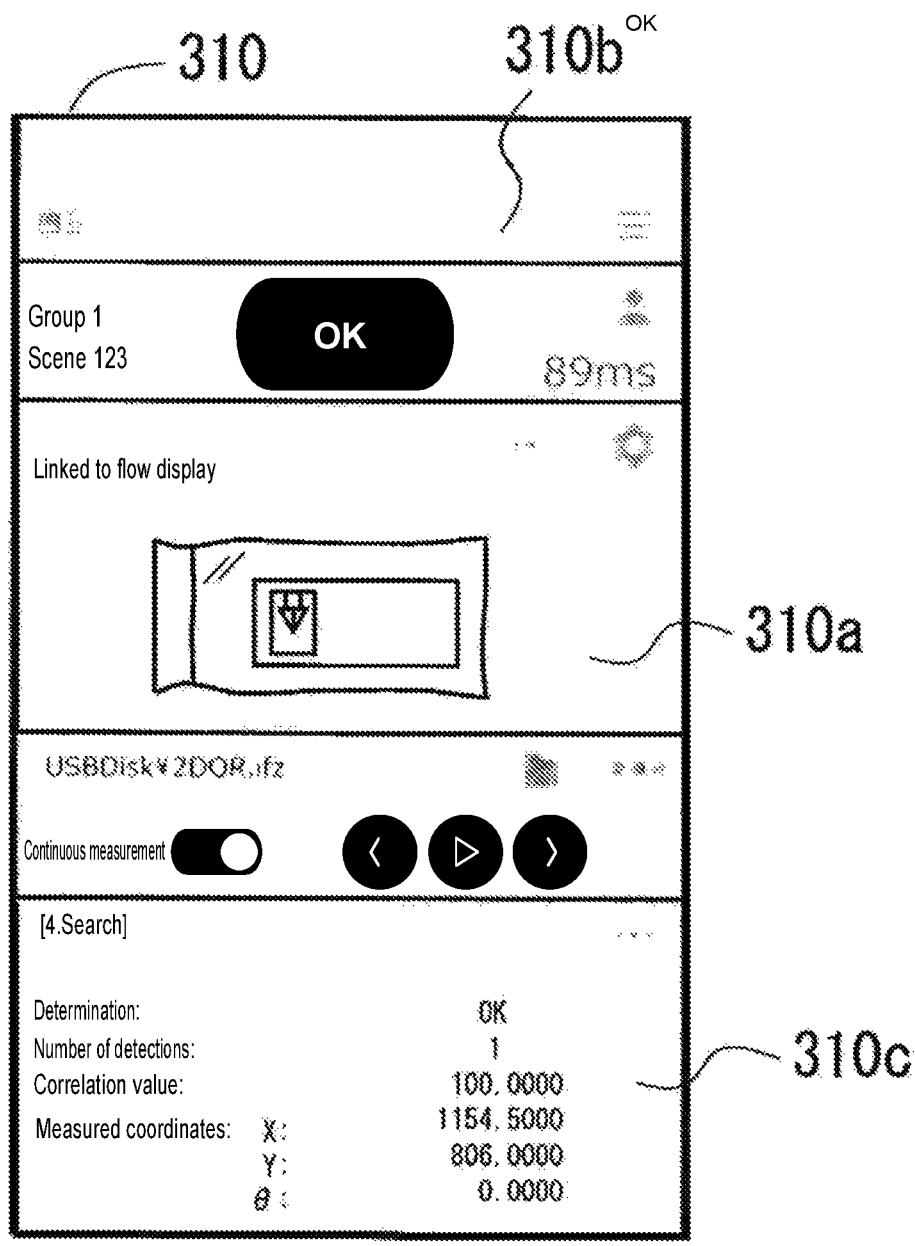
FIG. 7A is a diagram schematically illustrating the display example of the image sensor information in a smartphone used by the user belonging to the category of the designer.

FIG. 7A shows a display example in a case where the user of the operation terminal 10 belongs to the category of the designer. As shown in FIG. 7A, each of an image 310a processed by the image sensor 50, a process result 310b, and detailed information 310c of the process is displayed on a screen 310. Therefore, the user can simply check the operation of the process of the image sensor 50, for example, at the site where the image sensor 50 is used.

Figure 7B:
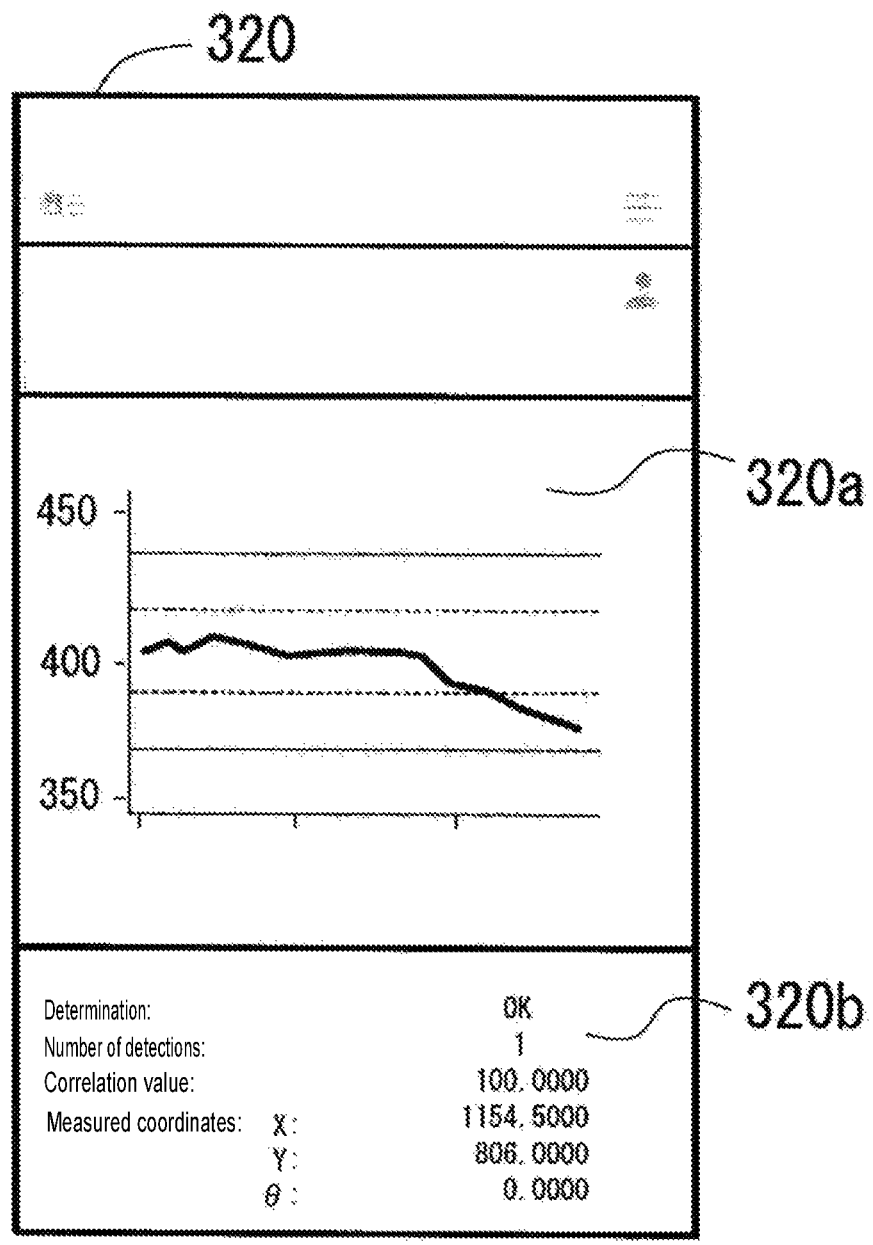
FIG. 7B is a diagram schematically illustrating the display example of the image sensor information in a smartphone used by the user belonging to the category of the line manager.

FIGS. 7B and 7C show display examples in a case where the user of the operation terminal 10 belongs to the category of the line manager. As shown in FIG. 7B, each of a graph 320a showing the transition of the measurement value in the process executed by the image sensor 50 and detailed information 320b of the process is displayed on a screen 320. In addition, as shown in FIG. 7C, each of a process result 330a of the process executed by the image sensor 50 and an execution result 330b of the analysis program is displayed on a screen 330. In the present embodiment, as an example, the user operates the operation terminal 10 to switch the display between the screen 320 and the screen 330. Therefore, for example, the user can check the statistical information based on the process of the image sensor 50 at the site where the image sensor 50 is used more simply than a case where the tablet is used.

Figure 7D:
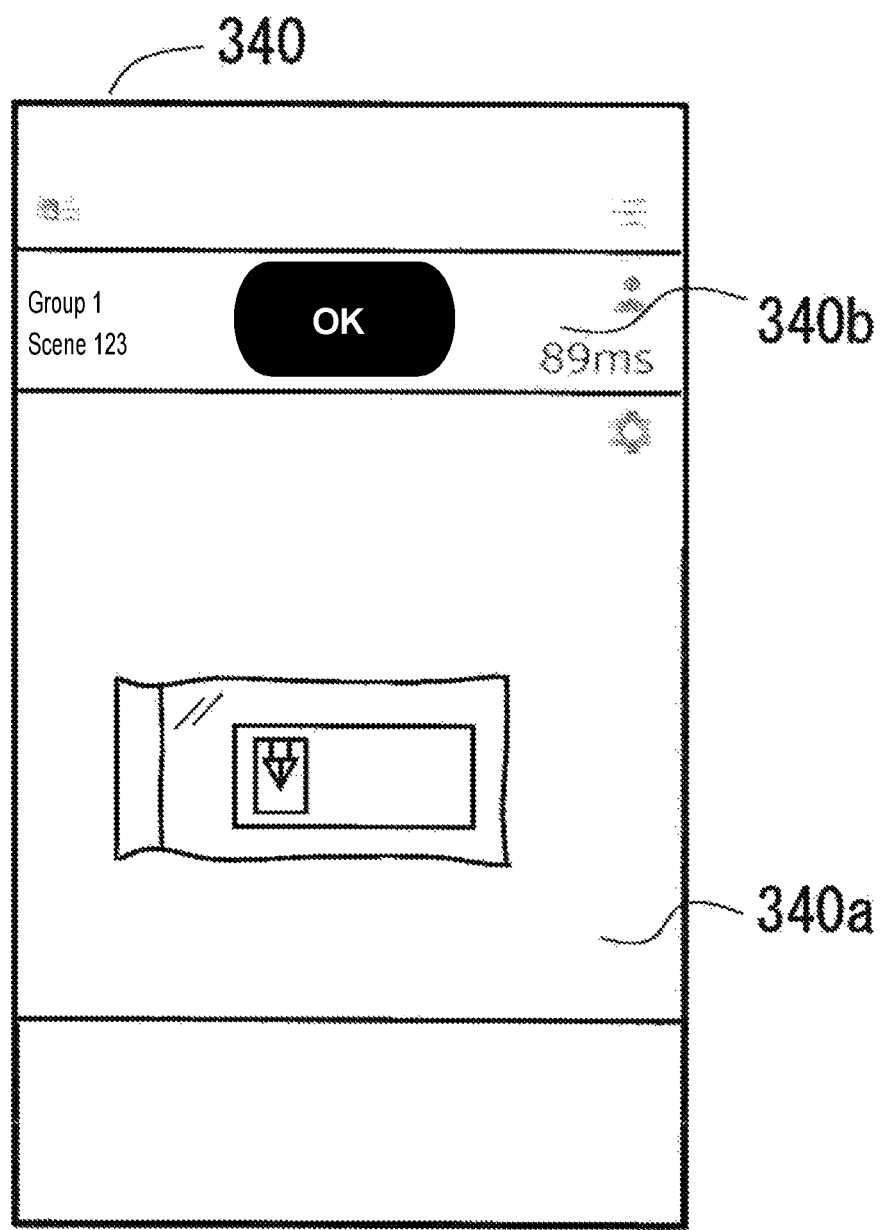
FIG. 7D is a diagram schematically illustrating the display example of another image sensor information in a smartphone used by the user belonging to the category of the site operator.

FIG. 7D shows a display example in a case where the user of the operation terminal 10 belongs to the category of the site operator. As shown in FIG. 7D, each of an image 340a processed by the image sensor 50 and a process result 340b is displayed on a screen 340. Therefore, the user can check the current operation situation of the image sensor 50 more simply than a case where the tablet is used.

As described above, according to the present embodiment, in accordance with the category to which the user of the image sensor belongs and the operation terminal used by the user, suitable information, in which the presence or absence of the item related to the examination by the image sensor or the size, the position, or the like of the display area of the information displayed on the monitor 20 is customized, is provided with a suitable screen layout. Therefore, even in a case where different types of operation terminals are used each time the user checks the information of the image sensor, the user can check the information suitable for the operation with the screen layout that is easy to see on each operation terminal.

<Other>

The above-described embodiments merely exemplify a configuration example of the disclosure, and the image sensor system according to the disclosure is not limited to the above-described specific configuration. The disclosure is not limited to the above-described specific form and various modifications are possible within the scope of the technical spirit thereof. In addition, in practice, specific configurations according to the embodiments are appropriately adopted, and various improvements and modifications may be made. For example, in the above-described embodiment, it is assumed that the operation terminal 10 is the PC. However, in a case where the operation terminal 10 is a tablet or a smartphone, the monitor 20 and the input device 30 are integrated as a touch panel display with the operation terminal 10 and the above-described process is executed. In addition, the image sensor 50 and the camera 60 may be integrally configured.

In addition, for example, a communication device that provides at least one of the functional parts of the image sensor 50 exemplified in the above-described embodiment may be configured to provide data for displaying the suitable information of the image sensor with the suitable screen layout to a plurality of operation terminals connected to the communication device in accordance with each operation terminal and each user. In addition, a plurality of image sensors may be connected to the communication device and the communication device may be configured to provide the above-described data to the image sensor designated by the user of the operation terminal 10. Therefore, it is possible to provide an image sensor system capable of displaying information of each of the plurality of image sensors with the suitable screen layout by the plurality of operation terminals.

<Computer-Readable Recording Medium>

A management tool for setting the operation terminal, the image sensor, or the like, and a program for realizing the OS and the like are able to be recorded on a recording medium readable by a computer or the like in the computer or other machine and apparatus (hereinafter, a computer or the like). In addition, it is possible to provide the function thereof by causing the computer or the like to read and execute the program of the recording medium.

Here, the recording medium readable by the computer or the like refers to a recording medium that accumulates information such as data and a program by electrical, magnetic, optical, mechanical, or chemical action and can be read from the computer or the like. Among such recording media, as a recording medium removable from the computer or the like, there is, for example, a flexible disk, a magneto-optical disk, a CD ROM, a CD-R/W, a DVD, a Blu-ray disk, a DAT, an 8 mm tape, a memory card such as a flash memory, and the like. In addition, as a recording medium fixed to the computer or the like, there is a hard disk, a ROM, or the like.

APPENDIX

An image sensor system (1) having an image sensor (50) that performs an examination of a product and an operation terminal (10) for externally operating the image sensor (50), the image sensor system (1) including:

a recognition part (101, 501) configured to specify user information of a user who uses the operation terminal (10) and device information of the operation terminal (10);

a determination part (101, 501) configured to determine display information on the examination displayed on a display part (20) used by the operation terminal (10) and a disposition of the display information on the display part on the basis of the specified user information and the specified device information; and a generation part (101, 501) configured to generate data for displaying the display information in the determined disposition on the display part (20) of the operation terminal (10).

According to this, since it is possible to generate data in which image sensor information having a content according to the user information is displayed with a screen layout suitable for screen sizes of each operation terminal used by the user, it is possible to display suitable image sensor information for each user with a suitable screen layout in the operation terminal used by each user.

In addition, in the image sensor system, the device information may include performance information for specifying at least one of a screen size of the display part used by the operation terminal, a resolution of the display part, a device name of the operation terminal, and an operating system (OS) executed by the operation terminal, and the determination part may determine the disposition of the display information on the display part on the basis of the performance information included in the specified device information. In addition, the determination part may specify a category related to the image sensor to which the user belongs on the basis of the specified user information and determine the display information on the basis of the specified category. In addition, the category may include a designer of the image sensor, and in a case where the specified category is the designer of the image sensor, the display information may include information on a flow of a process executed by the image sensor. In addition, the category may include a manager of the image sensor, and in a case where the specified category is the manager of the image sensor, the display information may include statistical information on the image sensor. In addition, the disposition of the display information may be determined on the basis of presence or absence of at least an item related to the examination. In addition, the disposition of the display information may include a size of a display area for displaying the display information on the display part and a position of the display area on the display part. In addition, the recognition part may acquire user agent information from the operation terminal and may specify the device information from the user agent information.

According to the disclosure, it is possible to provide a technique capable of generating data of a screen suitable for each operation terminal displaying information of an image sensor.

What is claimed is:

1. An image sensor system having an image sensor that performs an examination of a product and an operation terminal for externally operating the image sensor, the image sensor system comprising:
a recognition part configured to specify user information of a user who uses the operation terminal and device information of the operation terminal;
a determination part configured to determine display information on the examination displayed on a display part used by the operation terminal and a disposition of the display information on the display part on the basis of both of the specified user information and the specified device information; and
a generation part configured to generate data for displaying the display information in the determined disposition on the display part of the operation terminal,
wherein the device information comprises device type indicating a type of the operation terminal, and
the determination part specifies a user category related to the user of the image sensor on the basis of the specified user information and determines items and a screen layout of the display information displayed on the display part on the basis of a combination of the specified user category and the device information.

2. The image sensor system according to claim 1, wherein the device information comprises performance information for specifying at least one of a screen size of the display part used by the operation terminal, a resolution of the display part, a device name of the operation terminal, and an operating system executed by the operation terminal, and
the determination part determines the disposition of the display information on the display part on the basis of the performance information comprised in the specified device information.

3. The image sensor system according to claim 2, wherein the disposition of the display information is determined on the basis of presence or absence of at least an item related to the examination.

4. The image sensor system according to claim 2, wherein the disposition of the display information comprises a size of a display area for displaying the display information on the display part and a position of the display area on the display part.

5. The image sensor system according to claim 2, wherein the recognition part acquires user agent information from the operation terminal and specifies the device information from the user agent information.

6. The image sensor system according to claim 1, wherein the category comprises a designer of the image sensor, and
in a case where the specified category is the designer of the image sensor, the display information comprises information on a flow of a process executed by the image sensor.

7. The image sensor system according to claim 6, wherein the category comprises a manager of the image sensor, and
in a case where the specified category is the manager of the image sensor, the display information comprises statistical information on the image sensor.

8. The image sensor system according to claim 6, wherein the disposition of the display information is determined on the basis of presence or absence of at least an item related to the examination.

9. The image sensor system according to claim 1, wherein the category comprises a manager of the image sensor, and in a case where the specified category is the manager of the image sensor, the display information comprises statistical information on the image sensor.

10. The image sensor system according to claim 1, wherein the disposition of the display information is determined on the basis of presence or absence of at least an item related to the examination.

11. The image sensor system according to claim 1, wherein the disposition of the display information comprises a size of a display area for displaying the display information on the display part and a position of the display area on the display part.

12. The image sensor system according to claim 1, wherein the recognition part acquires user agent information from the operation terminal and specifies the device information from the user agent information.

13. An image sensor used for the image sensor system according to claim 1, wherein the image sensor has at least one functional part of the recognition part, the determination part, and the generation part,
the image sensor further comprises a transmission part configured to transmit information processed by the functional part comprised in the image sensor to an outside.

14. The image sensor system according to claim 1, wherein the type of the operation terminal comprises a PC, a tablet and a smartphone.

15. A data generation method of an image sensor in an image sensor system having the image sensor that performs an examination of a product and an operation terminal for externally operating the image sensor, the data generation method comprising:
specifying, by a recognition part of the image sensor system, user information of a user who uses the operation terminal and device information of the operation terminal, wherein the device information comprises device type indicating a type of the operation terminal;
specifying a user category related to the user of the image sensor on the basis of the specified user information;
determining, by a determination part of the image sensor system, items and a screen layout of display information on the examination displayed on a display part used by the operation terminal on the basis of a combination of the specified user category and the specified device information, and a disposition of the display information on the display part on the basis of both of the specified user information and the specified device information; and
generating, by a generation part of the image sensor system, data for displaying the display information in the determined disposition on the display part of the operation terminal.

16. A non-transitory computer-readable recording medium storing a data generation program of an image sensor in an image sensor system having the image sensor that performs an examination of a product and an operation terminal for externally operating the image sensor, the data generation program causing a computer in the image sensor system to execute following processes:
specifying user information of a user who uses the operation terminal and device information of the operation terminal, wherein the device information comprises device type indicating a type of the operation terminal;
specifying a user category related to the user of the image sensor on the basis of the specified user information;
determining items and a screen layout of display information on the examination displayed on a display part used by the operation terminal on the basis of a combination of the specified user category and the specified device information, and a disposition of the display information on the display part on the basis of both of the specified user information and the specified device information; and generating data for displaying the display information in the determined disposition on the display part of the operation terminal.

\* \* \* \* \*